United States Patent [19]

Warthen et al.

[11] 4,045,372

[45] Aug. 30, 1977

[54] CONTROL OF PHYSICAL PROPERTIES OF ALUMINA EXTRUDATES

[75] Inventors: John Lawrence Warthen, Baltimore; Warren Stanley Briggs, Silver Spring, both of Md.; Marvin Vernon Paggen, Sulphur, La.

[73] Assignee: W. R. Grace & Co., New York, N.Y.

[21] Appl. No.: 701,679

[22] Filed: July 1, 1976

Related U.S. Application Data

[63] Continuation-in-part of Ser. No. 606,275, Aug. 20, 1975, abandoned.

[51] Int. Cl.$^2$ .............................................. B01J 21/04
[52] U.S. Cl. ................................ 252/463; 423/213.2; 423/213.5
[58] Field of Search ..................... 252/463; 423/213.2, 423/213.5

[56] References Cited

U.S. PATENT DOCUMENTS

| 3,661,806 | 5/1972 | Briggs et al. | 423/213.5 |
| 3,853,789 | 12/1974 | Warthen et al. | 252/463 |
| 3,898,322 | 8/1975 | Leach | 252/463 X |
| 3,917,808 | 11/1975 | Leach et al. | 252/463 X |

Primary Examiner—W. J. Shine
Attorney, Agent, or Firm—Arthur P. Savage

[57] ABSTRACT

A process for preparing extrudates of alumina monohydrate having densities, surface areas and pore volumes within a predetermined range by mixing the alumina with a sufficient quantity of water to prepare an extrudable product and aging this product for a period of ½ to 6 hours. The alumina is then extruded and the extrudates dried using conventional techniques. The alumina is primarily used as a base for auto exhaust conversion catalysts.

5 Claims, 2 Drawing Figures

CONTROL OF PHYSICAL PROPERTIES OF ALUMINA EXTRUDATES

This application is a continuation-in-part of application Ser. No. 606,275 filed Aug. 20, 1975, and now abandoned.

BACKGROUND OF THE INVENTION

Aluminas have many applications. They are used, for example, as selective adsorbents, catalysts and catalyst supports. It is desirable to have a product with a narrow pore size distribution range for many of these applications. Hydrous alumina or alumina gel generally formed by adding ammonia or other alkaline material to a suitable aluminum salt. The porsity characteristics of the alumina are determined, in some instances, by the method of preparation. The products generally have an extremely wide pore size distribution range with the pores between 150 and 1,000 to 2,000A.

U.S. Pat. No. 3,322,494 to Magee et al. describes a process for preparing alumina having a pore size distribution in the 1,000 to 2,000 A range by adding small amounts of microcrystalline cellulose to an ammonia solution, mixing the ammonia with an aluminum salt solution, aging the mixture, filtering to remove the precipitate, followed by drying and calcination steps. U.S. Pat. No. 3,325,247 to Magee et al. describes a process for producing gamma alumina having a pore size distribution in the 500 to 1,500A range by preparing a polyethylene glycol-ammonium carbonate solution and mixing this solution with an aluminum nitrate solution following aging, filtering and calcination steps. U.S. Pat. No. 3,853,789 to Warthen et al. describes a process for preparing strong, attrition resistant alumina extrudates having large mercury pore volumes by extruding specific proportions of aluminum monohydrate and gamma alumina powders.

The importance of pore size distribution in catalysts designed to convert the noxious components in auto exhaust gases to innocuous entities is discussed in some detail in U.S. Pat. No. 3,661,806 of Briggs et al. This reference discloses a process for preparing a catalyst support that has a large percentage of the pores in the greater than 3500A size range with a substantial portion in the size range less than 120A. The large pores of this specific size are no longer of primary importance since their function was to trap the lead salts in the auto exhaust gases. The gasoline currently being used with the auto exhaust conversion catalyst systems is lead free, thus, eliminating the need for the extremely large pores, but certain microporosity is required for activity retention.

BRIEF DESCRIPTION OF THE INVENTION

We have found that the density, crush strength, water pore volume and surface area of alumina extrudates used as a base for auto exhaust conversion catalysts can be controlled within very narrow limits by mixing alpha alumina monohydrate powder with a sufficient quantity of water to prepare an extrudable mix and aging this mixture at room temperature for periods of ¼ to 8 hours, preferably ½ to 6 hours. The density, crush strengths, and surface area increase with this treatment. The water pore volume decreases with this treatment.

DETAILED DESCRIPTION OF THE INVENTION

The first step in our process is the selection of a proper raw material. Alpha alumina monohydrate is available in quantity from several suppliers. There is no particular limitation as to the alumina except that the particle size should be in the powder range, that is, 10 to 150 microns with the average size being 60 microns. These alumina powders may be prepared by various known techniques such as the techniques disclosed in French Pat. No. 1,250,000, Canadian Pat. No. 663,383 and British Pat. No. 1,024,317.

After the alumina powder has been selected it is mixed with a sufficient quantity of water to form an extrudable paste. Addition of 1.0 to 1.4 lbs. of water per lb. of alumina gives satisfactory results with the preferred amount being 1.2 to 1.3 lbs.

After the water is added the alumina is thoroughly mixed with the water to form an extrudable paste. The mixing is carried out for a period of 20 to 60 minutes. When a double blade Sigma mixer or muller is used mixing is normally continued for about 30 minutes.

The critical step of our process is the aging step. After the alumina is mixed with the water the mix is discharged into any suitable holding tank and aged at 30 to 50° C. for the period of time necessary to impart the desired physical properties to the product. As pointed out above, the density, crush strength, and surface areas increase with an increase in aging time. In addition, the percentage of pores in the 200 to 300A and greater than 300A size range decreases significantly with increased aging.

The alumina is then extruded using a worm type extruder and dried in a forced draft dryer, at a temperature of 150° to 270° F.

The mercury pore volume is obtained by forcing mercury into the pores. The measurement of mercury pore volume was accomplished by using a standard mercury porosimeter. The operation of this system is dependent on the fact that mercury can be forced into different sized pores depending on the pressure exerted. Thus, at 100 p.s.i. absolute pressure, mercury can be forced into pores having a diameter above 17,500A. As the size of the pores decreases, the amount of pressure required to force mercury into the pores increases. This method has been described in detail in the publication of Ritter, H. L. and Drake, L. D., Ind. Eng. Chem. Anal. Ed. 17,787(1945).

Crushing strengths were measured by placing an individual alumina extrudate pellet in axially horizontal position on a flat plate and measuring the total force in pounds required to crush the same, the force being applied from above through two three eighths inch diameter disc bearings on the top surface of the pellet.

The physical properties of the product are conveniently measured after calcination of the dried extrudate at a temperature of 1850° F. for a period of 1 hour.

The alumina is then impregnated with components active for the conversion of the noxious components in auto exhaust into innocuous entities. The preferred catalytically active components are the noble metals, platinum and palladium. Thes noble metals are impregnated onto the base using conventional techniques. The platinum component is conveniently added by contacting the extrudates with a solution of chloroplatinic acid. The palladium component can be added conveniently using the solution of palladium tetraamine nitrate. After the impregnation is complete the extrudates are dried in the presence of steam, air or mixtures of air and steam at temperatures of about 120° to 260° F. After the catalyst is dried it is then calcined for periods of about 1 to 6 hours at temperatures of about 700° to 1400° F.

Figure 1:
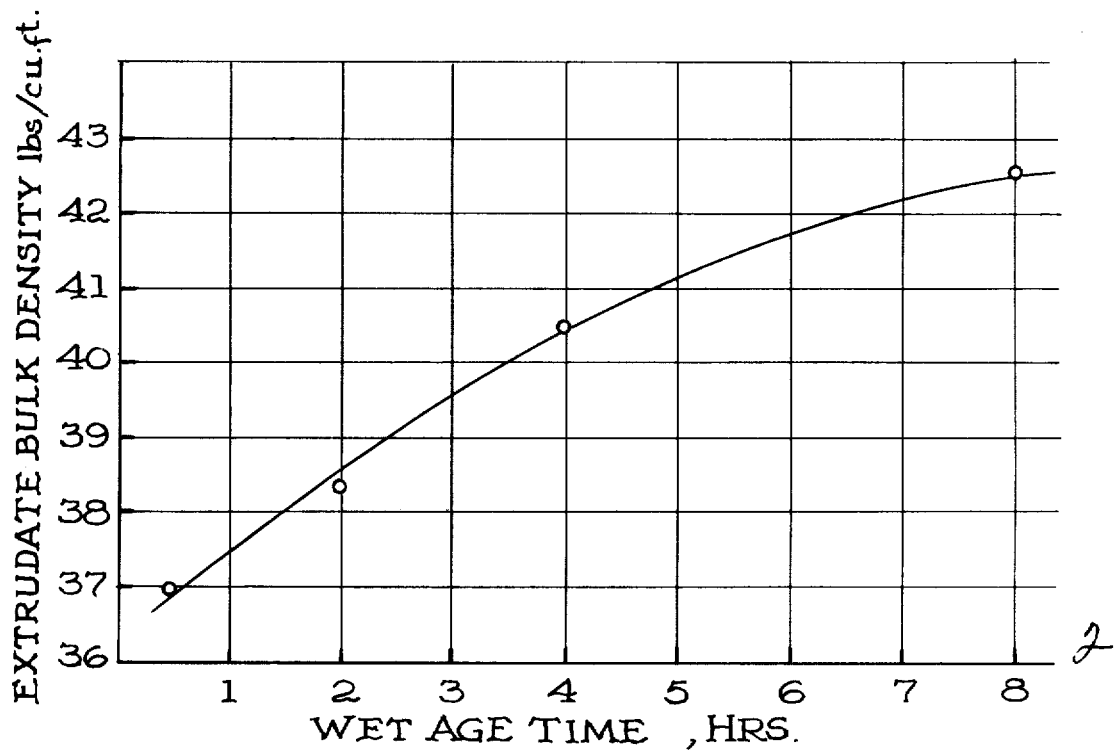
FIG. 1 is a graph showing the effect of the wet age on the extrudate bulk density of the extruded product.
Figure 2:
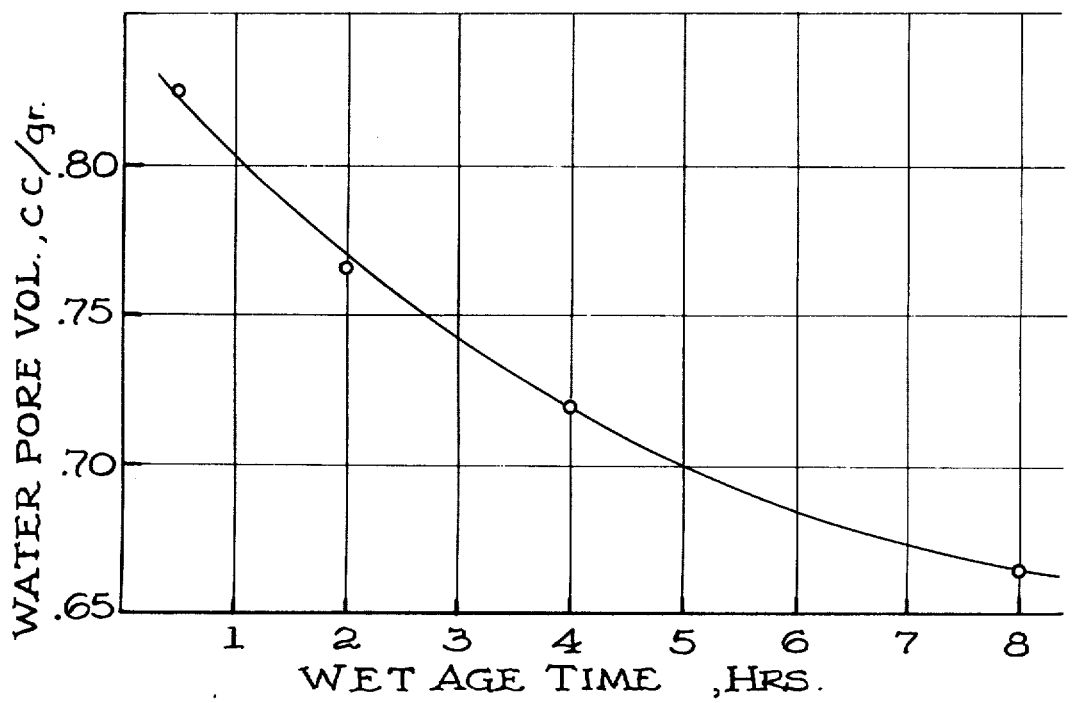
FIG. 2 illustrates the effect of aging times on the pore volume of the product.

Our invention is illustrated by the following specific but non-limiting examples.

EXAMPLE 1

An alpha alumina monohydrate powder (1095 pounds) was mixed with 300 pounds of micropulverized recycle alumina which had been calcined at 1900° F. for 0.5 hours. The alumina was mixed with 1771 pounds of deionized water in a Sigma double blade mixer for a period of 32 minutes. At this time the mixture was in the form of an extrudable paste. The mixture was discharged into 55 gallon drums and aged for periods ½, 2, 4 and 8 hours. At the end of these respective times the mix was extruded and extrudate samples taken at steady state conditions were immediately dried in a forced draft dryer at 270° F. for 0.75 to 2 hours. The dry extrudates, having an average length to diameter ratio of 1.7, were then stabilized by calcining for 1 hour at 1850° F. in a conventional muffle furnace. The physical properties of the product were determined. The data collected is set out in Table I below.

TABLE I

| Hrs. Age (Nominal) of Wet Mix | ½ | 2 | 4 | 8 |
|---|---|---|---|---|
| Time (min.) End Mix to Start Extr. | 18 | 118 | 238 | 480 |
| Extr. Time | 20 | 15 | 17 | 16 |
| Extrudate Wet Age Time | 10 | 10 | 9 | 9 |
| Total Wet Age | 48 | 143 | 264 | 505 |
| KW at Extruder | 14–15 | 14–15 | 14–15 | 15 |
| Amps at Extruder | 39–40 | 38–42 | 38–43 | 40 |
| Physicals (1–1850) | | | | |
| Density, Lbs./ft.$^3$ | 37.0 | 38.4 | 40.5 | 42.5 |
| Crush No./Attrition, % | 8.4/2.3 | 10.0/3.7 | 13.6/1.8 | 16.4/2.4 |
| Diameter, in. | .132 | .130 | .128 | .127 |
| $H_2O$ PV, cc/g. | .825 | .766 | .723 | .667 |
| SA, m$^2$/g. | 99 | 101 | 107 | 112 |
| Hg PV: Total | .8844 | .9314 | .7642 | .7772 |
| % 35–100 Å | 4.9 | 4.0 | 6.2 | 4.8 |
| 100–150 " | 14.4 | 12.9 | 21.1 | 19.6 |
| 150–200 " | 30.1 | 35.4 | 40.3 | 40.7 |
| 200–300 " | 17.0 | 13.3 | 11.0 | 13.4 |
| > 300 " | 33.5 | 34.4 | 21.5 | 21.5 |

It is obvious from review of these data that the density of the product increases substantially with increased aging time. The density increased from 37 to 42.5 lbs. per cubic foot with this treatment. The most dramatic changes are the decrease in the percentage of pores in the size range above 200A and increase in the percentage of pores in the 150 to 200A size range after aging for 4 hours.

EXAMPLE 2

Two separate mixes designated A and B prepared by the general procedure of Example 1, were aged for from 1 to 6 hours and the percentage of pores having diameters of less than 100A to greater than 200A was measured. This data is set out in Table II below.

TABLE II

| | Mix A 64.5 | | Mix B 64.6 | |
|---|---|---|---|---|
| TV of Mix | | | | |
| Wet Mix Age, Hrs. | 1 | 2 | 3 | 6 |
| Physicals (1–1850° F.) | | | | |
| Density, Lbs./ft.$^3$ | 35.3 | 34.9 | 36.6 | 40.0 |
| $H_2O$ PV, cc/g. | .830 | .839 | .776 | .672 |
| Hg PV, cc/g., Total | .8047 | .8315 | .7865 | .6466 |
| % In Pores 100 Å | 2.3 | 3.9 | 3.3 | 5.5 |
| 100–150 " | 9.0 | 10.4 | 18.1 | 24.8 |
| 150–200 " | 31.5 | 31.9 | 38.3 | 61.5 |
| 200–300 " | 22.1 | 21.0 | 12.1 | 0.2 |
| 300 " | 35.1 | 32.8 | 28.3 | 8.1 |
| | | | | 8.3 |

The data show clearly that the density of the product increases with increased aging time. The pore volume decreases and the percentage of pores in the 200–300A size range decreases. 150–200A pores increase with age.

What is claimed is:
1. A process for preparing an auto exhaust conversion catalyst which consists essentially of the steps of:
   a. preparing an alpha alumina monohydrate in the 10 to 150 micron size range,
   b. adding a sufficient quantity of water to form an extrudable paste,
   c. aging said paste at ambient temperatures for 0.5 to 6 hours,
   d. extruding the alumina to form extrudates,
   e. drying and calcining the extrudates,
   f. contacting the extrudates with solutions of salts of metals having activity for conversion of the noxious components of exhaust gases to innocuous entities,
   g. drying, calcining and recovering the product.
2. The process according to claim 1 wherein the extrudates have a large percentage of pores in the 200 to greater than 300A size range.
3. The process according to claim 1 wherein the extrudates are aged at temperature of 30° to 50° C.
4. The process according to claim 1 wherein the extrudates are dried in step (e) in a forced draft dryer at a temperature of 150° to 270° F.
5. The process according to claim 1 wherein the extrudates are calcined in step (g) at temperatures of 700° to 1400° F. for 1 to 6 hours.

* * * * *